Feb. 26, 1924. 1,484,641
W. E. GOODWIN
LUBRICATING ARRANGEMENT FOR THE CRANK CASES OR OIL CHAMBERS OF MOTOR VEHICLES
Filed Oct. 27, 1922 3 Sheets-Sheet 2

INVENTOR:
Walter E. Goodwin
Wm Wallace White
ATTY.

Feb. 26, 1924.   1,484,641
W. E. GOODWIN
LUBRICATING ARRANGEMENT FOR THE CRANK CASES OR OIL CHAMBERS OF MOTOR VEHICLES
Filed Oct. 27, 1922   3 Sheets-Sheet 3

INVENTOR:
Walter E. Goodwin
by Wm. Wallace White
ATTY

Patented Feb. 26, 1924.

1,484,641

UNITED STATES PATENT OFFICE.

WALTER ERNEST GOODWIN, OF SALE, ENGLAND.

LUBRICATING ARRANGEMENT FOR THE CRANK CASES OR OIL CHAMBERS OF MOTOR VEHICLES.

Application filed October 27, 1922. Serial No. 597,247.

*To all whom it may concern:*

Be it known that I, WALTER ERNEST GOODWIN, a subject of the King of Great Britain and Ireland, residing at 1 South Bank, Northenden Road, Sale, in the county of Chester, England, have invented new and useful Improvements in Lubricating Arrangements for the Crank Cases or Oil Chambers of Motor Vehicles, of which the following is a specification.

My improvements relate to lubricating arrangements for the crank cases or other oil chambers of motor vehicles and in particular to the crank cases of the Ford car.

In supplying the crank case, or sumph, of such motor vehicles, the lubricant requires to be poured into a charging inlet or breather pipe very awkwardly situated under the bonnet into which it is difficult to pour oil without incurring waste and risk of damage to clothes. Some owners provide themselves with particular types of tundish to obviate loss of oil.

Upon the crank case two cocks are fitted, one at a low level, and the other at a higher level. These cocks are also very awkwardly disposed and they can only be operated by kneeling down and groping for them with a pair of pliers. As is known, if oil reaches the upper cock, the crank case is sufficiently charged, but if the oil falls below the level of the lower cock then the sumph contains too little.

As stated, not only is it difficult to charge the crank case with oil, but, to check the contained quantity by operating the cocks is a job which a user finds objectionable and one which is often shirked. For this reason Ford engines are apt to be over or under lubricated.

I provide a separate oil reservoir or supply tank together with a pump or forcing device and I use a vessel or float chamber in combination therewith. This vessel or float chamber communicates with the sumph, crank case, or other chamber to be supplied, and a control valve is used which is automatically controlled in manner permitting the pump to supply oil to the sumph or the like if the level is too low, but if sufficiently high then the pumped oil returns to the oil reservoir or supply tank.

The attached drawings illustrate a suitable arrangement of parts according to my system of supplying lubricating oil to sumphs or such like of engines, and, in the drawings.

According to my invention I provide a separate or auxiliary oil reservoir or supply tank $a$, that is, a distinct vessel which can be charged with lubricant through the filler opening $a'$ which may be provided with a sieve $a^2$. This oil reservoir or supply tank $a$ has combined with it a hand pump $b$ drawing its supply from the oil reservoir $a$ through a sieve $b'$ and the said reservoir or supply tank $a$ may be located on the running board or elsewhere as found convenient.

The oil to be supplied to the crank case or sumph is poured into this reservoir or supply tank $a$.

In connection with the crank case or sumph is a vessel or float chamber $c$ with a transfer pipe or flanged connection $c'$ by which communication exists between the sumph $d$ and the vessel or float chamber $c$, the oil in the sumph $d$ finding its own level in the vessel or float chamber $c$. The level at which the opening $c^x$ exists in the vessel or float chamber $c$ is below what is a safe oil level in the sumph $d$. The level of the oil in the vessel or float chamber $c$ affects a float $a$ contained therein and which float may be guided. In connection with such float $e$ and its containing vessel $c$ I may use a system of levers $f$, fulcrumed at $f'$, the levers being connected by pivoted links $g$ to the float $e$ and by pivoted links $h$ to the prepared foot of or extensions from a movable control valve or oil distributor. Conveniently I use a movable control valve $i$ having a straight translation and bored right through at $i'$ for the passage of air as is necessary. This control valve is movable in an exterior housing or casing $j$ and is actuated by the movement of the float $e$, that is, when the oil level is too low, the float falls and moves or opens the control valve, whilst when a full supply of oil is contained in the sumph the level in the vessel or float chamber c coincides and the float e is lifted to draw down or close the control valve.

The control valve housing or casing has three pipe connections made to it, that marked j' being the inlet or feed pipe from the oil reservoir or supply tank, that marked j² being the outlet pipe leading to the crank case d', or sumph, as the case may be, whilst j³ is the outlet pipe leading back to the oil reservoir or supply tank a. The latter pipe j³ is preferably fitted with a sight-feed glass or equivalent contrivance marked j⁴ by which oil may be seen or indicated as passing back to the oil reservoir or supply tank a.

The control valve i may be of simply cylindrical type turned to several diameters and the valve housing or casing j may have a screwed-on cap j˟ bored at the points j²˟ and holding in place a gauze cap j³˟. Screwed nipples j⁵ with packings make good the pipe joints j', j², j³ to the valve housing or casing j.

Figure 1:
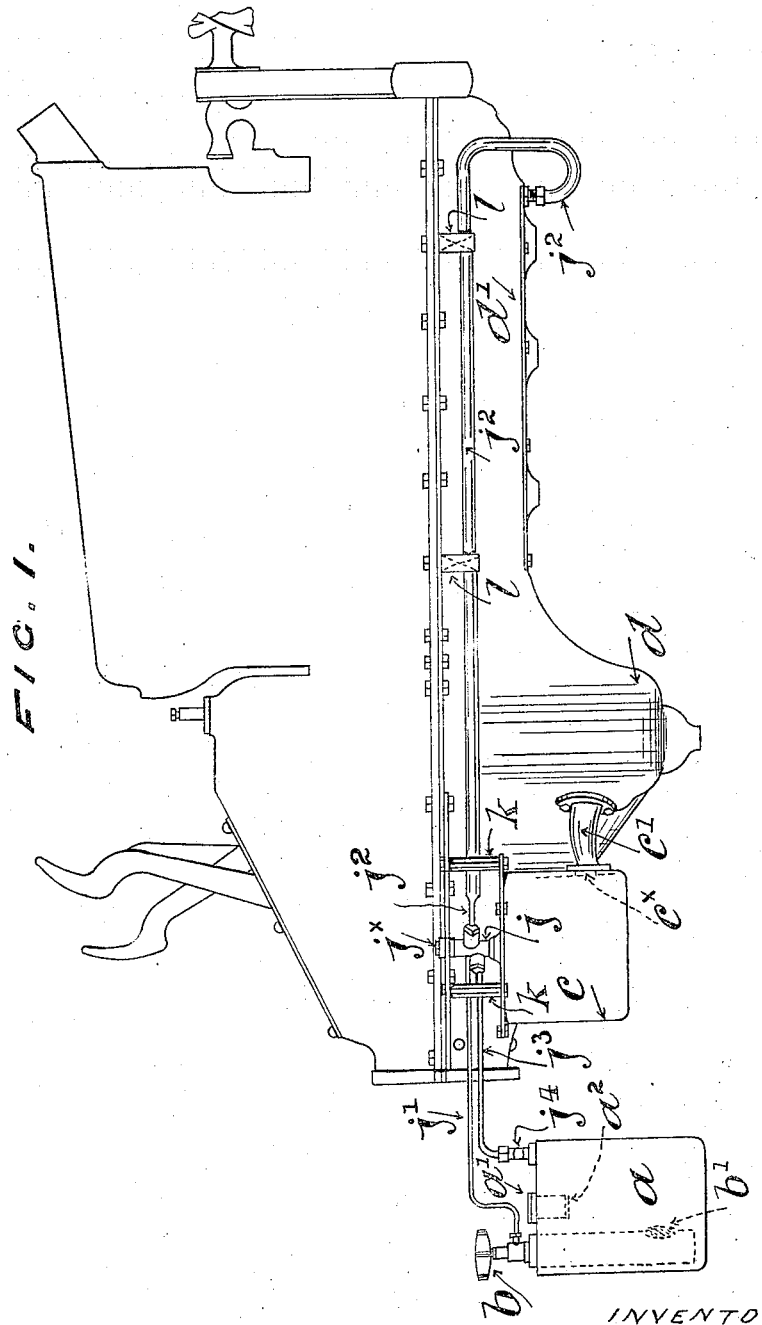
Fig. 1 is an elevation showing the system applied to a Ford power unit.
Figure 2:
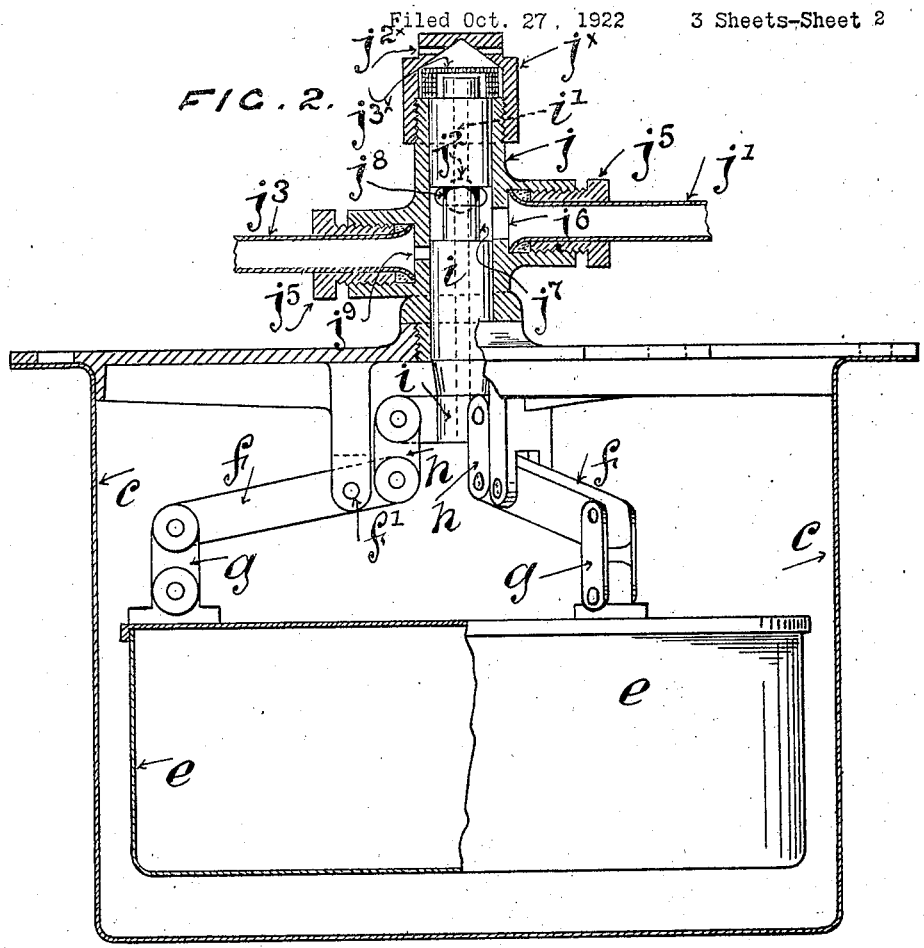
Fig. 2 shows a section of the oil distributor control valve and its casing together with the float vessel or chamber and the float lever and link mechanism.
Figure 3:
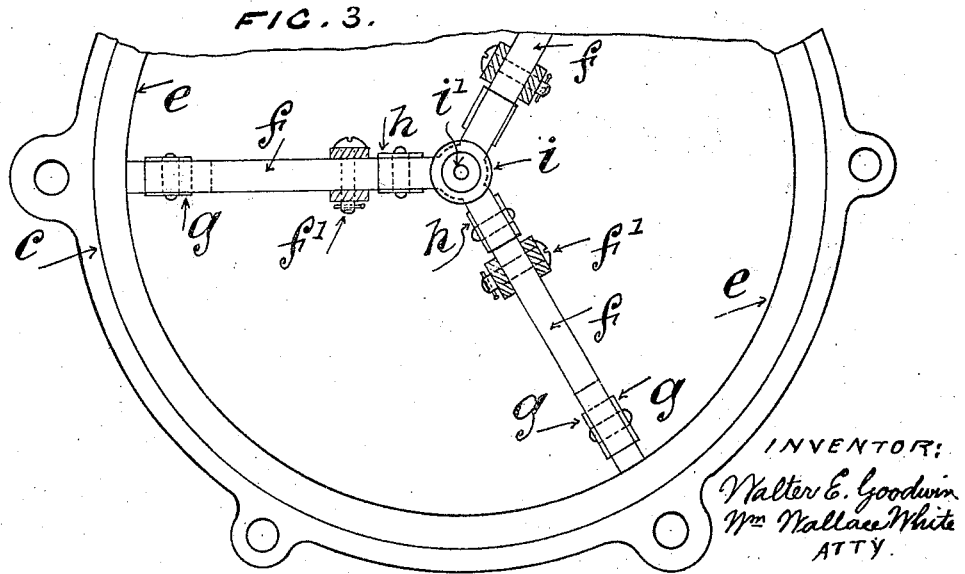
Fig. 3 is a plan of the float vessel, the lever and link mechanism, &c.
Figure 4:
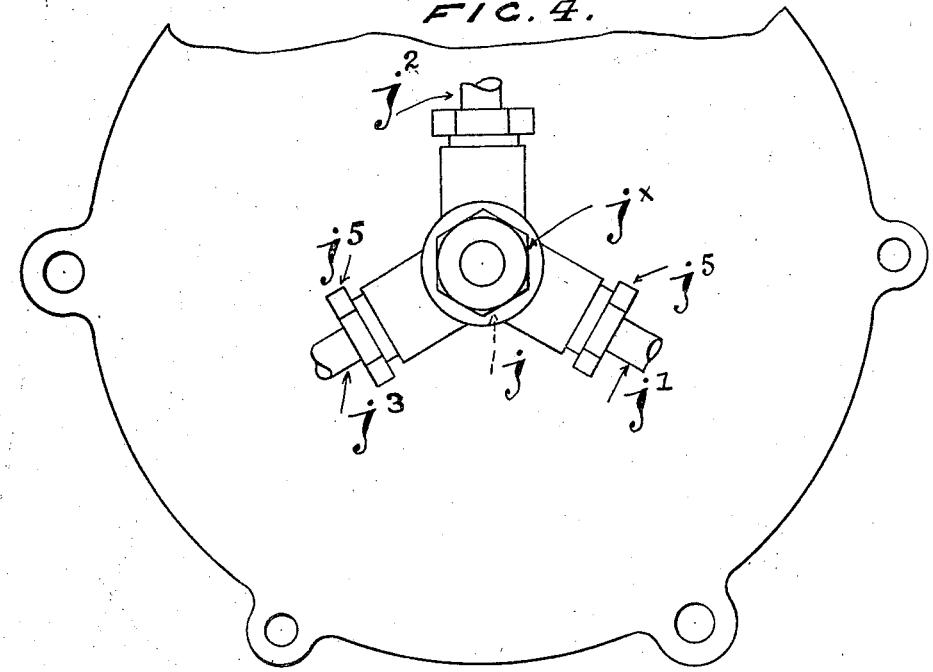
Fig. 4 shows a plan of the oil distributor control valve housing or casing, the pipe connections, and the cover of the float tank.
Figure 5:
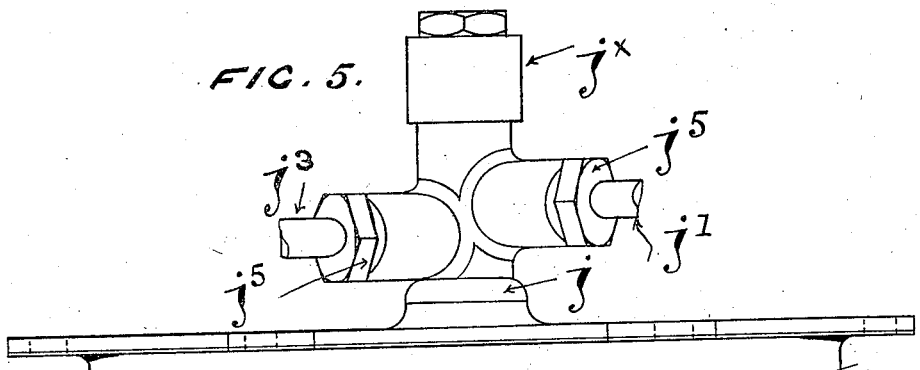
Fig. 5 is a side elevation of the oil distributor control valve housing or casing and the float vessel or chamber.

If the car user has reason to think the oil in the sumph or crank case needs replenishing, he simply operates the pump b on the reservoir or supply tank a and forces oil therefrom along the inlet or feed pipe j' to the control valve housing or casing. Should the float e be down (as in Fig. 2) the control valve i allows the oil to enter through the port j⁶ and by reason of the reduced neck j⁷ to pass through the port j⁸ and along the outlet pipe j² leading to the crank case d'. The user goes on pumping until the oil in the sumph d rises and also correspondingly enters the float chamber e. When the level in the float chamber rises sufficiently, it operates and through the float, &c., lowers the control valve i gradually drawing the latter down. When the crank case is sufficiently charged, the control valve i has moved to such an extent as to cut-off the outlet pipe j² leading to the crank case and to obstruct the port j⁸ and to place the inlet or feed pipe j' in communication with the outlet pipe j³, via the port j⁹, said outlet pipe j³ leading back to the supply reservoir a. When this happens, no further oil can pass to the crank case and the user sees the oil passing back through the sight-feed glass j⁴ to the supply reservoir a. He then appreciates the fact, that the crank case or sumph is sufficiently supplied, and ceases to pump.

In any case of doubt, a user need only just work the pump and he knows, as soon as oil flows through the sight-feed glass, the sumph or crank case is sufficiently charged and that any further continuance of the use of the pump is only passing or circulating the oil from the supply reservoir back thereto without affecting the sumph or crank case. Thus over-oiling and waste is prevented, whilst the actuation of the pump is at any time an easy matter and so simply done that the owner can give the question of oiling attention at proper intervals.

The oil feed to supply the engine may be delivered at any convenient point or points the drawing illustrating delivery to the crank case d' and the oil flowing into the sumph d as is the ordinary practice with a Ford car for example.

It will be appreciated that on the fall of the float e following a fall of the oil level in the sumph, the movement of the float again opens the control valve.

My improvements are applicable to other makes of motor vehicles apart from Ford cars and to other reservoirs on cars which are required to supply oil to be kept at a level within limits.

By my invention I can provide a generous supply of oil ready for use and effect a clean and positive feed. The oil level cannot be raised above a pre-determined height which is the correct level required. There is no waste. The system reduces repairs and prolongs the life of the engine. There are no taps to open or close. The sight-feed shows conditions and can be placed in any convenient position. No connection exists between clean oil in the supply and the dirty oil in the sumph. Making good the oil level can be effected in the dark without risk of over-oiling.

I have shown the float-chamber c as supported from the engine casing by distance pieces k and bolts, and the delivery pipe j² supported by bolted-on brackets or supports l, but all this may be obviously much varied.

I declare that what I claim is.

1. Means for supplying lubricant to a crank case, sumph or other chamber adapted to receive lubricant, comprising an oil reservoir, a hand-actuated forcing device drawing from the reservoir, a float chamber, a passageway between the float chamber and the receiving chamber, a float in the float chamber, a control valve operated by the said float, a casing for the control valve, a pipe leading from the forcing device to the control valve casing, a passageway leading from the control valve casing to the chamber receiving lubricant, and a passageway leading back from the control valve casing to the oil reservoir.

2. Means for supplying lubricant to a crank case or chamber adapted to receive lubricant, comprising an oil reservoir, a forcing device drawing from the reservoir, a float chamber, a passageway between the float chamber and the receiving chamber, a float in the float chamber, a control valve, lever and link mechanism between the float and the control valve, a passageway leading from the pump to the control valve casing, a passageway leading from the control valve casing to the receiving chamber, and a passageway leading back from the control valve casing to the oil reservoir.

3. Means for supplying lubricant to a crank case or other chamber adapted to receive lubricant, comprising an oil reservoir, a forcing device drawing from the reservoir, a float chamber, a passageway between the float chamber and the receiving chamber, a float in the float chamber, a control valve operated by the said float, a casing for the control valve, a pipe leading from the forcing device to the control valve casing, a passageway leading from the control valve casing to the chamber receiving lubricant, a passageway leading back from the control valve casing to the oil reservoir and a sight-feed on said passageway for the purposes set forth.

4. Means for supplying lubricant to a crank case or sumph adapted to receive lubricant, comprising an oil reservoir, a pump drawing from the reservoir, a float chamber, a passageway between the float chamber and the receiving chamber, a float in the float chamber, a control valve, lever and link mechanism between the float and control valve, a casing for the control valve, a pipe leading from the pump to the control valve casing, a passageway leading from the control valve casing to the receiving chamber, a pipe leading back from the control valve casing to the oil reservoir, and a sight-feed on said pipe.

In testimony whereof I have signed my name to this specification.

WALTER ERNEST GOODWIN.